Patented Feb. 23, 1943

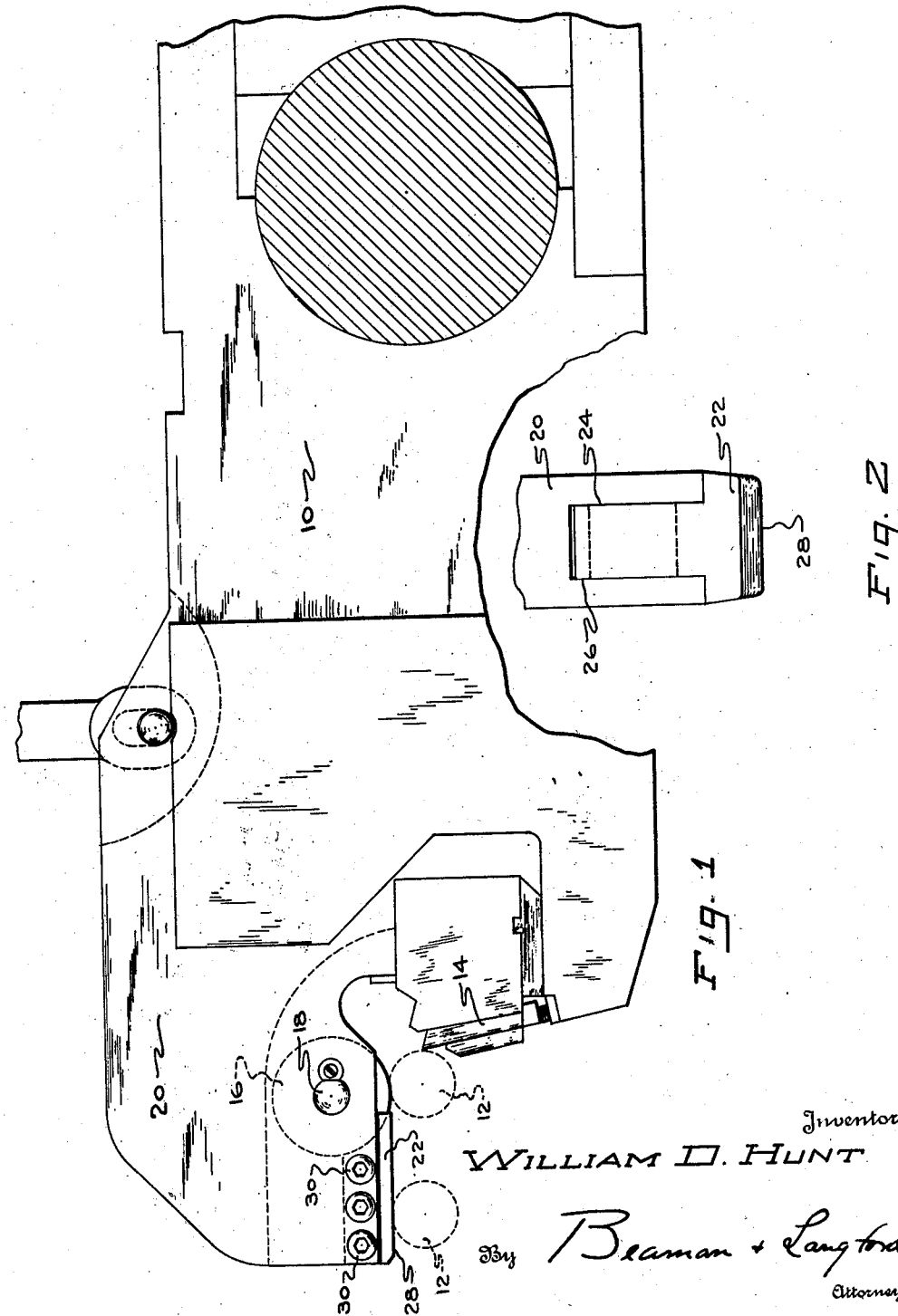

2,312,248

UNITED STATES PATENT OFFICE 2,312,248

CRANKSHAFT LATHE

William D. Hunt, Jackson, Mich., assignor to Crankshaft Machine Company, Jackson, Mich., a corporation of Michigan Application July 26, 1939, Serial No. 286,499

4 Claims. (Cl. 82—35)

The present invention relates to improvements in crank shaft lathes, having particular reference to lathes equipped with tool arms of the general type disclosed in the Melling Patent No. 1,550,914, granted August 27, 1925.

In tool arms of the type shown in the aforesaid patent, a roller rests upon the crank pins to support the tool arm and to oppose the thrust of the tool through the work. Where it is desired to machine the cheeks of the throws of the crank shaft, as well as the pins, the amount of relative feed between the tool arm and the crank shaft is such as to require a relatively large roller in order that support may be given to the tool arm throughout the feeding range and the points of engagement between the roller and the tool upon the crank pins are correct for satisfactory machining. As the amount of feed required for cheeking increases as the throw of the crank increases, it necessitates a corresponding increase in the diameter of the roller required engaging with the pins for supporting the tool arm. In machining relatively large cranks, the increase in diameter of the roller required may become excessive, increasing costs of construction, and making the tool arm bulky. It is the purpose of the present invention to correct this situation.

Thus, the primary object of the present invention is to provide an improved tool arm for crank shaft lathes of the type which rests upon the crank pin and is characterized by its ability of being used in cases where substantial relative feed between the crank shaft and tool is desirous.

Another object is to provide an improved tool arm of the type described in which the supporting approach for the cheeking operation is provided in advance of the roller support for turning the pins of a crank shaft.

Another object is to provide tool arms for crank shafts supported on the pins in which a wear resisting relatively fixed surface is provided for supporting engagement with the pins during the major portion of the relative feed between the tool and crank shaft, in advance of a relatively small supporting roller for supporting the tool arm while the pin is being machined.

A further object of the invention is to provide an improved tool arm of the type described in which a supporting surface engaging with a crank pin is provided of a character enabling the tool to be fed a substantial distance to machine the cheeks of the crank.

These and other objects and advantages residing in the arrangement, construction and combination of parts will be more fully set forth in the following detailed description and claimed in the annexed claims as features of the present invention.

In the drawing, wherein a single embodiment of the present invention is illustrated, Fig. 1 is a fragmentary side elevational view of a tool arm embodying the present invention, and Fig. 2 is a fragmentary end view of a tool arm showing the construction of the tool support shoe.

In the embodiment of the invention illustrated, reference character 10 generally designates the tool arm of a crank shaft lathe suitably supported for orbital movement so as to machine the pin of a crank shaft indicated in dotted lines in two different positions and designated by reference character 12. The specific construction of the tool arm, or the manner in which its orbital movement is affected, for the most part forms no part of the present invention. Reference may be had to the Melling patent above mentioned for a more complete understanding of tool arms of this general type. The cutting tool is indicated by reference character 14 and is shown supported in cutting relation with the pin 12 of the crank shaft, in one position, through a roller 16 supported for rotation about a shaft 18 located in the overhanging portion 20 of the tool arm. As in the case of the roller in the aforesaid Melling patent, the roller 16 rests upon the pin 12 to back up the action of the tool 14 so as to avoid serious deflection on the crank shaft during the machining operation, due to working stresses.

Where a substantial amount of relative feed between the tool arm and the crank shaft is desired, as in the case where the cheeks of the crank shaft are to be machined as well as the pins, it has been the practice heretofore to sufficiently increase the diameter of the roller support for the tool arm to take care of the feed. In lieu of this practice, the present invention offers what appears to be a more practical arrangement by providing a wear resisting approach adapted to rest upon the pins in advance of a relatively small roller rest giving support to the tool arm during machining of the pin. As illustrated, the approach takes the form of a tool support shoe 22 having a ribbed portion 24 extending into a slot 26 in the overhanging portion 20. The shoe 22 is held in position in the tool arm 10 by suitable screws 30. It will be noticed from a consideration of Fig. 1 that the supporting surface 28 of the shoe 22 is substantially tangential to the roller rest 16. The dotted line representation of the pin 12 shown in contact with the surface 28 of the shoe 22 depicts the relation between the shoe 22 and the pin during the period of initial relative feed between the crank shaft and the tool arm for facing the cheeks. As relative feeding takes place between the tool arm and the crank shaft, the pin advances along the surface 28 until the pin is engaged with the roller rest 16 at which time the machining of the pin takes place. In practice, it has been found that by making the tool support shoe 22 of wear resisting metal, that no objectional amount of wear arises, notwithstanding the fact that rotation takes place between the pin 12 and the surface 28. It has been found, however, that it is desirable to have a roller rest for engaging the pin at the time the pin is being machined in order to reduce wear.

The aforesaid described arrangement permits substantial feeding movement between the crank shaft and tool arm and, at the same time, permits the use of a relatively small roller rest to be used with the assurance that the cutting tool will be in a correct position for the most satisfactory results throughout the entire machining operation of the cheeks and pins.

Having thus described my invention, what I desire to protect by Letters Patent and claim is:

1. A tool arm of the type described for crank shaft lathes, comprising a tool arm supporting roller resting upon the pin of the crank, and a non-circular supporting approach in advance of and in alignment with the operative portion of said roller for bearing against the pin to support the arm and along which the pin traverses for supporting the tool arm prior to being supported by said roller, said roller being arranged with respect to said approach so as to cause said pin to relatively transfer directly from said approach to said roller.

2. A tool arm of the type described for crank shaft lathes, supported at one end directly upon a crank pin, comprising a roller support for the tool arm adapted to rest upon a crank pin, and a fixed supporting surface for bearing against the pin to support the arm and along which the pin traverses in approaching said roller support, said surface being substantially tangential to said roller support directly adjacent thereto so as to cause said pin to relatively transfer directly from said surface to said roller.

3. A tool arm of the type described for turning pins and facing cheeks of crank shafts in crank shaft lathes, comprising a cutting tool supported in the arm, a relatively small roller support for the tool arm mounted therein to one side of said cutting tool and engageable with a crank pin while it is being turned by said cutting tool, and a supporting surface in advance of said roller support and engageable with the crank pin for supporting the tool arm from the pin while the tool is being fed for facing the cheeks of the crank shaft.

4. A tool arm of the type described for crank shaft lathes, supported at one end directly upon a crank pin, said arm comprising a cutting tool, a portion of said tool arm overhanging said cutting tool and extending forward thereof, a tool supporting shoe supported from said overhanging portion, and a roller support located in said overhanging portion at one end of said shoe with the lower face of said shoe substantially tangential to said roller, said shoe and roller being engageable with a crank pin and along which the pin traverses upon relative feeding movement between the crank and said cutting tool.

WILLIAM D. HUNT.